US011525398B2

(12) United States Patent
Gianopulos

(10) Patent No.: US 11,525,398 B2
(45) Date of Patent: Dec. 13, 2022

(54) ENGINE INLET WITH DEPLOYABLE PARTICLE SEPARATOR

(71) Applicant: The Boeing Company, Chicago, IL (US)

(72) Inventor: Elia N. Gianopulos, Rose Valley, PA (US)

(73) Assignee: THE BOEING COMPANY, Chicago, IL (US)

( * ) Notice: Subject to any disclaimer, the term of this patent is extended or adjusted under 35 U.S.C. 154(b) by 809 days.

(21) Appl. No.: 16/373,106

(22) Filed: Apr. 2, 2019

(65) Prior Publication Data

US 2020/0318542 A1 Oct. 8, 2020

(51) Int. Cl.
| | |
|---|---|
| *B01D 39/00* | (2006.01) |
| *F02C 7/052* | (2006.01) |
| *B64C 39/02* | (2006.01) |
| *B64C 21/06* | (2006.01) |
| *B64D 33/02* | (2006.01) |
| *B64C 27/04* | (2006.01) |
| *B64D 13/06* | (2006.01) |

(52) U.S. Cl.
CPC ............. *F02C 7/052* (2013.01); *B64C 21/06* (2013.01); *B64C 39/02* (2013.01); *B64D 33/02* (2013.01); *B64C 27/04* (2013.01); *B64D 2013/0651* (2013.01); *B64D 2033/0246* (2013.01); *B64D 2033/0253* (2013.01); *Y02T 50/60* (2013.01)

(58) Field of Classification Search
CPC ......... F02C 7/052; B64C 21/06; B64C 39/02; B64C 27/04; B64D 33/02; B64D 2013/0651; B64D 2033/0246; B64D 2033/0253; Y02T 50/60
See application file for complete search history.

(56) References Cited

U.S. PATENT DOCUMENTS

| | | | | | |
|---|---|---|---|---|---|
| 2,944,631 | A | * | 7/1960 | Thomas ................. | B64D 33/02 55/306 |
| 3,449,891 | A | * | 6/1969 | Amelio .................. | B01D 45/16 55/306 |
| 3,483,676 | A | * | 12/1969 | Sargisson ............... | F02C 7/052 55/306 |
| 4,250,703 | A | * | 2/1981 | Norris ....................... | F02C 7/05 55/306 |
| 4,537,608 | A | * | 8/1985 | Koslow .................. | B01D 50/20 55/347 |
| 4,655,413 | A | * | 4/1987 | Genssler ................. | F02C 7/042 137/15.1 |
| 4,836,473 | A | * | 6/1989 | Aulehla ................... | B64C 21/00 244/130 |
| 5,697,394 | A | * | 12/1997 | Smith .................... | B64D 33/02 137/15.1 |
| 7,192,462 | B2 | * | 3/2007 | Stelzer ............... | B01D 46/0005 55/306 |
| 7,866,600 | B2 | | 1/2011 | Barnard et al. | |
| 7,871,455 | B1 | * | 1/2011 | Sands .................... | B64D 33/02 96/417 |
| 8,512,450 | B2 | * | 8/2013 | Kazlauskas ............ | B64D 33/02 55/306 |
| 9,254,921 | B2 | * | 2/2016 | Braeutigam ........... | B64D 33/02 |

(Continued)

*Primary Examiner* — Dung H Bui
(74) *Attorney, Agent, or Firm* — Gates & Cooper LLP

(57) ABSTRACT

A system that filters airborne particles when the aircraft is in a dusty environment and is disengaged when the aircraft is flying up and away from the dusty environment.

20 Claims, 8 Drawing Sheets

(56) References Cited

U.S. PATENT DOCUMENTS

| | | | |
|---|---|---|---|
| 2002/0182062 A1* | 12/2002 | Scimone | B64D 33/02 415/121.2 |
| 2009/0261208 A1* | 10/2009 | Belyew | B01D 46/10 55/306 |
| 2014/0260127 A1* | 9/2014 | Boyce | F02C 7/055 55/306 |
| 2016/0075439 A1* | 3/2016 | Mores | B64D 33/02 244/53 B |
| 2017/0145919 A1* | 5/2017 | Aubert | F02C 7/055 |

* cited by examiner

ENGINE INLET WITH DEPLOYABLE PARTICLE SEPARATOR

BACKGROUND

1. Field

The present disclosure relates to an inlet system for a duct on an aircraft.

2. Description of the Related Art

A unique and key operational benefit helicopters and VTOL (vertical takeoff and landing) aircraft is their ability to take off and land in unprepared areas, unlike conventional fixed wing aircraft which take off and land in semi-prepared to prepared runways and airfields. Helicopters can land in fields, clearings within forests, in the mountains, on beaches and shoreline, or in the desert. In all of those potential landing zones dirt, sand, debris, and dust will be driven airborne around the vertical takeoff and landing aircraft due to the downward air passing through the rotor disc. These airborne particles can be ingested in the helicopter's engines causing deleterious effects from component wear to directly impacting rotating parts and potential catastrophic damage.

Conventional filtering systems detrimentally impact the flow of air into the aircraft engine, thereby reducing performance of the aircraft. What is needed is a system that efficiently filters the air when operating near the ground and in a dirty environment while reducing or minimizing impact on aircraft performance in cruise flight operation in a clean air environment. The present disclosure satisfies this need.

SUMMARY

The present disclosure describes an inlet system that filters air when operating in a dirty environment but is retracted in cruise flight operation in a clean air environment. The inlet system can be embodied in many ways including, but not limited to, the following.

1. An inlet system, comprising:
an inlet;
a first sidewall extending forward of a first side of the inlet;
a second sidewall extending forward of a second side of the inlet;
a particle separator panel between the first sidewall and the second sidewall;
a first seal on a first side of the particle separator panel and a second seal on a second side of the particle separator panel;
an actuator attached to the particle separator panel, wherein the actuator:
deploys the particle separator panel to cover the inlet so that the first seal seals the first side to the first sidewall and the second seal seals the second side to the second sidewall, thereby forcing air inputted to the inlet to flow through the particle separator panel; and
retracts the particle separator panel to uncover the inlet.

2. The inlet system of embodiment 1, further comprising a hinge attached to a forward end of the particle separator panel so that the particle separator panel pivots about the hinge when the actuator deploys or retracts the particle separator panel and the actuator is attached to an aft end of the panel.

3. The inlet system of embodiment 1, wherein the particle separator panel comprises a barrier filter including pores so that particles in the air larger than the pores are trapped in the barrier filter.

4. The inlet system of embodiment 1, wherein the particle separator panel comprises a swirl tube drawing particles out of the air.

5. An environmental control system coupled to the inlet so that the air flowing through the inlet can be used in the environmental control system.

6. The system of embodiment 5, wherein the environmental control system is an air conditioning unit.

7. A propulsion system coupled to the inlet so that the air flowing through the inlet can be used to combust fuel in the propulsion system.

8. The inlet of embodiment 1, wherein the first sidewall, the second sidewall, and the inlet are in a skin of an airframe.

9. The inlet of embodiment 8, wherein the particle separator panel is flush with the skin when the particle separator panel is retracted.

10. The inlet of embodiment 1, wherein the first sidewall, the second sidewall, and the inlet are in a body panel.

11. An aircraft, comprising;
an airframe having a skin, the skin comprising:
an inlet;
a first sidewall extending forward of a first side of the inlet; and
a second sidewall extending forward of a second side of the inlet;
a particle separator panel between the first sidewall and the second sidewall;
a first seal on a first side of the particle separator panel and a second seal on a second side of the particle separator panel;
an actuator attached to the particle separator panel, wherein the actuator:
deploys the panel to cover the inlet so that the first seal seals the first side to the first sidewall and the second seal seals the second side to the second sidewall, thereby forcing air inputted to the inlet to flow through the particle separator panel; and
retracts the panel to uncover the inlet; and
a propulsion system positioned aft of the inlet so that the air flowing through the inlet can be used to power the propulsion system.

12. The aircraft of embodiment 11, wherein the aircraft comprises a helicopter and the propulsion system comprises an engine for a rotor providing the helicopter with lift.

13. The aircraft of embodiment 11, further comprising a hinge attached to a forward end of the particle separator panel so that the particle separator panel pivots about the hinge when the actuator deploys or retracts the particle separator panel and the actuator is attached to an aft end of the panel.

14. The aircraft of embodiment 11, wherein the particle separator panel comprises a barrier filter including pores so that particles in the air larger than the pores are trapped in the barrier filter.

15. The aircraft of embodiment 11, wherein the particle separator panel comprises swirl tubes drawing particles out of the air.

16. The aircraft of embodiment 11, wherein the propulsion system is coupled to the inlet so that the air flowing through the inlet can be used to combust fuel in the propulsion system.

17. The aircraft of embodiment 11, wherein aircraft includes an airframe comprising a skin, and the first sidewall, the second sidewall, and the inlet are in the skin.

18. The aircraft of embodiment 17, wherein the particle separator panel is flush with the skin when the particle separator panel is retracted.

19. The aircraft of embodiment 11, wherein the aircraft comprises a body panel and the first sidewall, the second sidewall, and the inlet are in the body panel.

20. A method of operating aircraft, comprising:
providing or obtaining an airframe having a skin, the skin comprising:
an inlet coupled to an environmental control system or propulsion system;
a first sidewall extending forward of a first side of the inlet; and
a second sidewall extending forward of a second side of the inlet;
providing or obtaining a particle separator panel between the first sidewall and the second sidewall;
providing or obtaining a first seal on a first side of the particle separator panel and a second seal on a second side of the particle separator panel; and
actuating an actuator attached to the particle separator panel; the actuator:
deploying the panel to cover the inlet so that the first seal seals the first side to the first sidewall and the second seal seals the second side to the second sidewall, thereby forcing air inputted to the inlet to flow through the particle separator panel when operating the aircraft in a dirty environment wherein the air comprises particles that degrade operation of the environmental control system or the propulsion system; and
retracting the panel to uncover the inlet when the aircraft is cruising in a cleaner environment wherein the air comprises a concentration of the particles that does not substantially degrade performance of the propulsion system or the environmental control system.

BRIEF DESCRIPTION OF THE DRAWINGS

FIG. 2A and FIG. 2B illustrate the inlet system comprising a barrier filter, according to one or more embodiments, wherein FIG. 2A illustrates the inlet system when the barrier filter is stowed and FIG. 2B illustrates the inlet system when the barrier filter is deployed.

FIG. 3A, FIG. 3B, and FIG. 3C illustrate the inlet system possessing a panel including a swirl tube, according to one or more embodiments, wherein FIG. 3A illustrates the inlet system when the panel is stowed, FIG. 3B illustrates the inlet system when the panel is deployed.

DESCRIPTION

Figure 1:
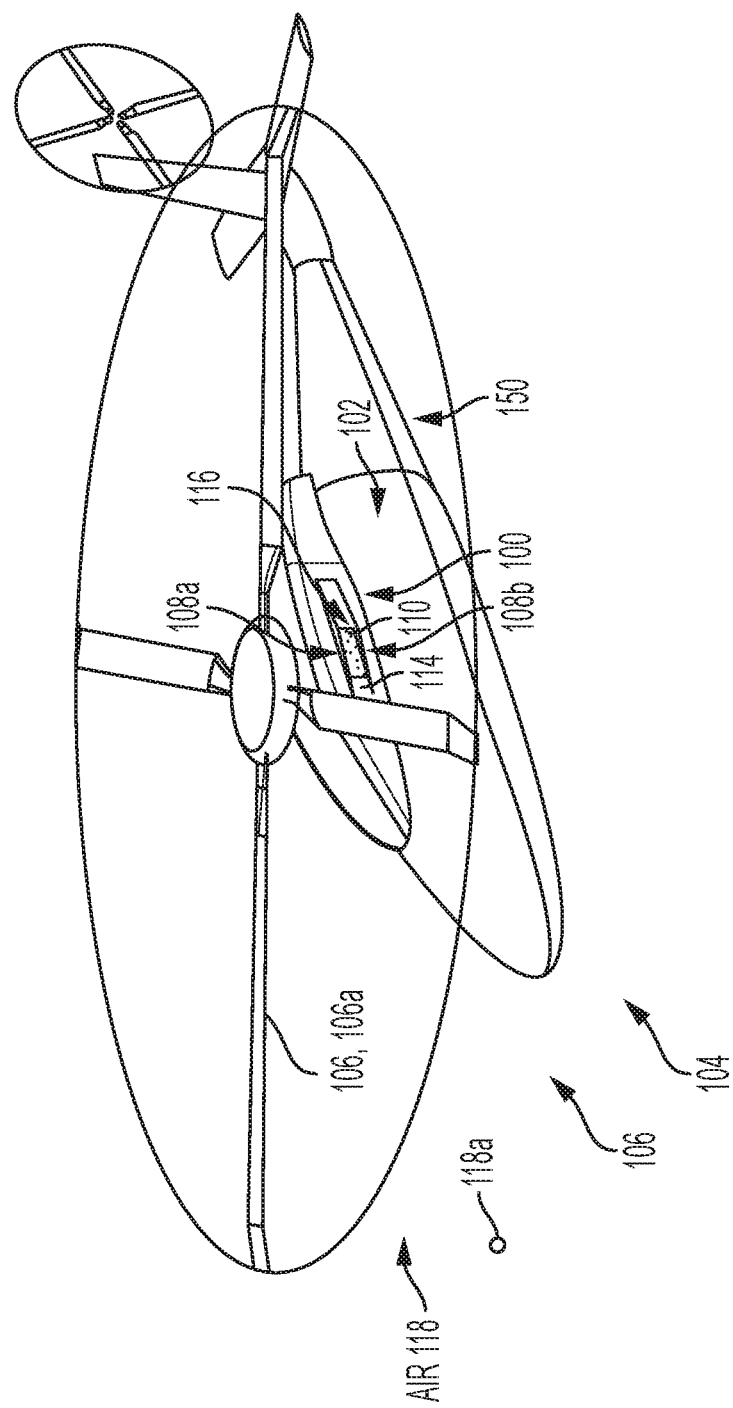
FIG. 1 illustrates an inlet system according to embodiments described herein.

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

The present disclosure describes a (e.g., conformal) air inlet system for a mechanism or apparatus inside a skin of an aircraft, e.g., a helicopter or vertical take off and landing (VTOL) aircraft, or other device. The mechanism or apparatus (e.g., an engine or an environmental control system) requires air to perform its function and has a performance degraded by ingestion of dirt, sand, dust, or other airborne debris or particles.

FIG. 1, FIG. 2A, FIG. 3A, and FIG. 4 illustrate the inlet system 100 comprising an inlet 100a for an engine inside the skin 102 of an aircraft 104 comprising a helicopter 106 having a rotor 106a including one or more rotor blades 106b. Forward and beside the inlet 100a are two tampering sidewalls (first sidewall 108a and second sidewall 108b). Forward of the inlet 100a and between the first sidewall 108a and second sidewall 108b is a particle separator panel 110 (e.g., filter or filtering panel). The particle separator panel 110 is hinged at its forward end 402 and the forward end is essentially flush with the loft surface 114 of the aircraft 104. The aft end 116 of the particle separator panel 110 is attached to an actuation mechanism 404. The actuation mechanism 404, when commanded, deploys the particle separator panel 110 up to cover the inlet 100a, thereby forcing air 118 to be drawn through the particle separator panel 110.

The particle separator panel 100 has seals 406 on a plurality of its edges. The seals prevent dirt, sand, dust and other airborne debris or particles 118a from passing around the particle separator panel 110 and entering into the inlet 100a and the mechanism drawing the air 118 in.

The actuation mechanism 404 can be commanded to retract and stow the particle separator panel 110 out of the airstream, allowing clean, unobstructed airflow into the inlet 100a. In one example, the actuation mechanism 404 is actuated by flight crew using a switch in the cockpit. In another example, the actuation mechanism is integrated in or coupled to a flight control system that commands the actuation mechanism when aircraft sensors determine the aircraft is within a specified distance from the ground.

In another example, the flight control system incorporates a functionality for inclement weather which results in ice formation on the particle separator panel. If ice forms on the particle separator panel and the air flow through the particle separator panel reduced, a command is initiated (e.g., by the flight crew initiated or automated via the flight control system) so that the particle separator panel can be raised further than the standard deployed height (allowing air to bypass the panel on its aft edge and thus allowing the internal mechanism to receive a less restricted air flow).

The Inlet

In one or more examples, the inlet 100a (feeding air 118 to a machinery or apparatus inside the aircraft) is designed to conform to the loft surface of the aircraft and present a low profile and a low aerodynamic drag impact to the aircraft. For example, when the apparatus inside the aircraft comprises turbo machinery (e.g., a turboshaft engine), the inlet provides a cross sectional area sufficient to provide the engine with acceptable airflow with performance degradation due to a constraint of the inlet.

As described above, on each side of the inlet 100a in the inlet system 100 are long, extended side walls comprising a first sidewall 108a and a second sidewall 108b. As well as extending forward of the inlet, the first sidewall 108a and the second sidewall 108b include sidewalls of the inlet 100a itself. During operation of the inlet system 100 when the particle separator panel is deployed and functioning by filtering particles, the first sidewall 108a and the second sidewall 108b are designed so as not to significantly or substantially disturb the airflow. During operation of the inlet system with the particle separator deployed and functioning to filter particles, the first sidewall 108a and the second sidewall 108b act as a feature to which flexible seals along the sides of the movable particle separator panel 110 can contact and seal. The seals prevent sand, dirt, and dust particles from bypassing the filter in the particle separator panel 110 and being ingested by the mechanism receiving the air flow.

Deployable Particle Separator Panel

Figure 2A:
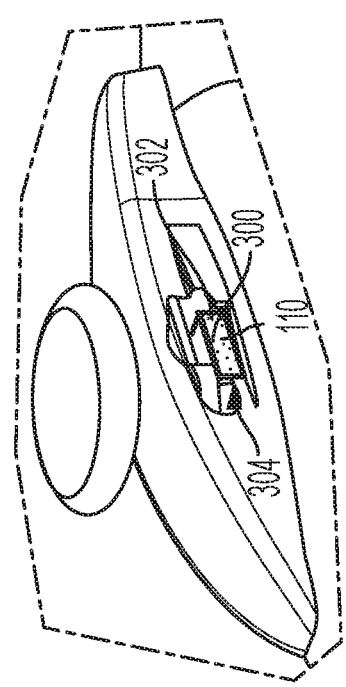
Figure 2B:
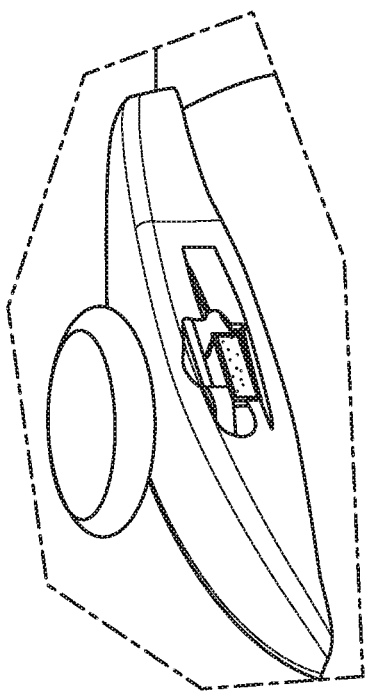

The particle separator panel 110 comprises an assembly containing a filtering medium and is designed to be deployed or stowed out of the way of airflow into the inlet 100a when not deployed. The assembly comprises a structural frame, akin to a picture frame, into which the filtering medium (or particle filtering device) is placed and secured. FIGS. 2A and 2B illustrate an example wherein the particle filtering device is a barrier filter and FIGS. 3A, 3B and 3C illustrate an example wherein the particle filtering device comprises swirl tubes employed in an assembly comprising a sandwich panel assembly.

FIG. 2A illustrates the particle separator panel 110 comprising a barrier filter 200 including a semi-porous material 204 contained within a surrounding support structure 206. The semi-porous material has pores 208, or openings, of a certain size. Any particles 118a larger than the opening size are trapped in the pores of the semi-porous material. In one or more examples, once the barrier filter has absorbed particles 118a, it begins to limit airflow to the engine and the barrier filter is removed and replaced.

Figure 3A:
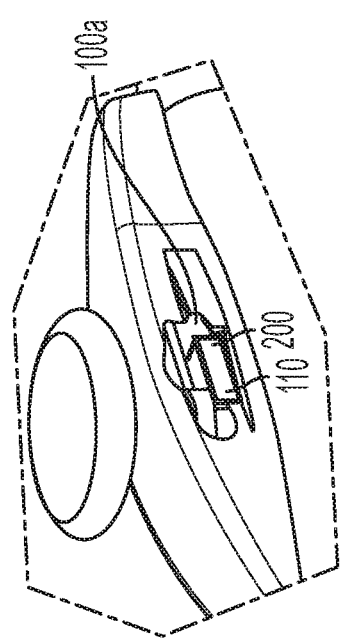
Figure 3B:
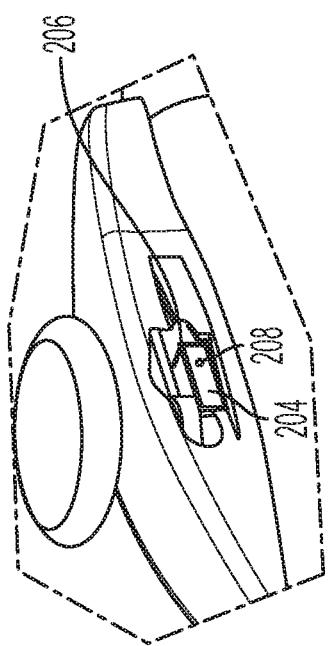
Figure 3C:
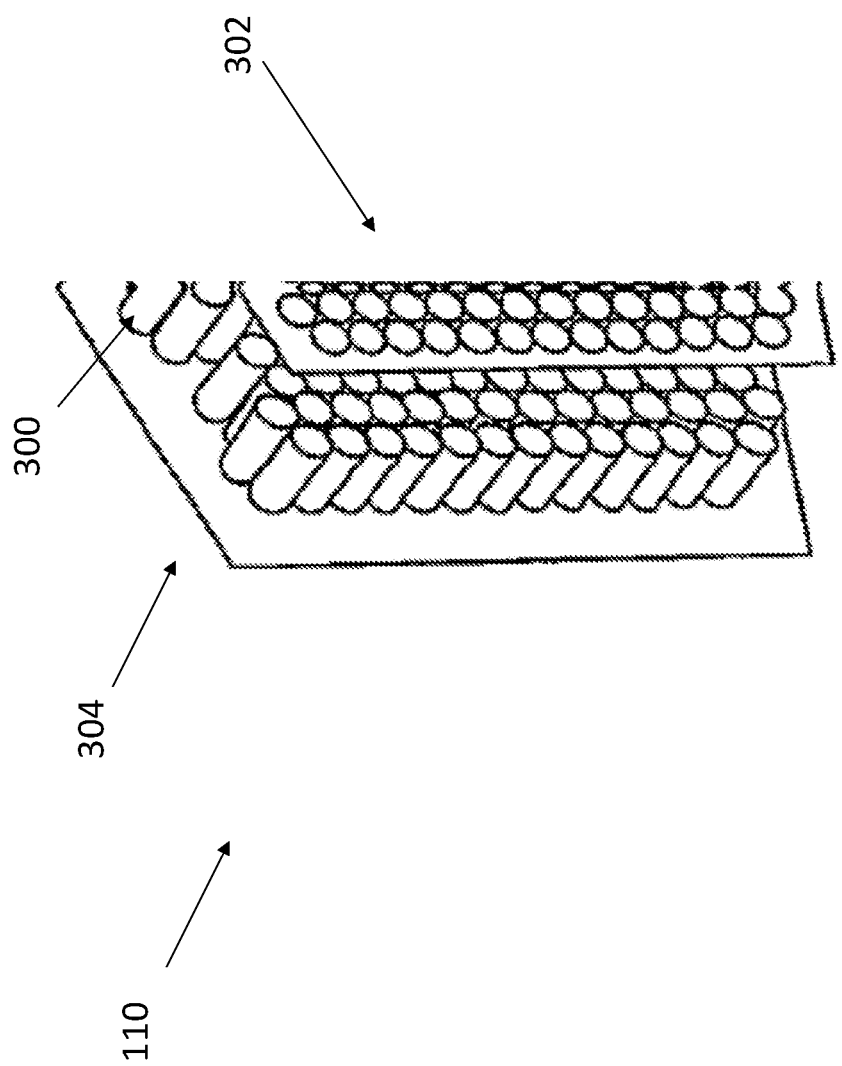

FIG. 3A illustrates an example wherein the particle separator panel 110 is suction powered and comprises swirl tubes 300 drawing particles out of the airflow passing through the swirl tubes 300. The particle separator panel 110 comprises an outer skin 302 and an inner skin 304 separated by a dimension. Spanning between the outer skin 302 and inner skin 304 are swirl tubes 300 comprising axial tubes with integrated swirl generators (or swirl generating mechanism). At the end of the axial tubes adjacent to the inner skin 304 are openings which allow passage to the space between the outer skin and the inner skin. As air with particles pass into the axial tube, the swirl generators impart energy to the air in the form of swirling motion. The swirled air then centrifugally forces the particles to the wall of the axial tube. The swirl generator then guides the particles to a point near the inner skin 304 where they are drawn into the space between the inner skin 304 and the outer skin 302. A separate suctioning mechanism draws a vacuum, or reduced air pressure, to the space between the outer skin 302 and the inner skin 304 and between the swirl tubes. This suctioning mechanism draws the particles from the swirl tubes before the particles can pass the inner skin 304, thereby removing particles from the airflow before the particles are ingested by the turbo machinery or other mechanical system requiring airflow.

Hinge Mechanism

Figure 4:
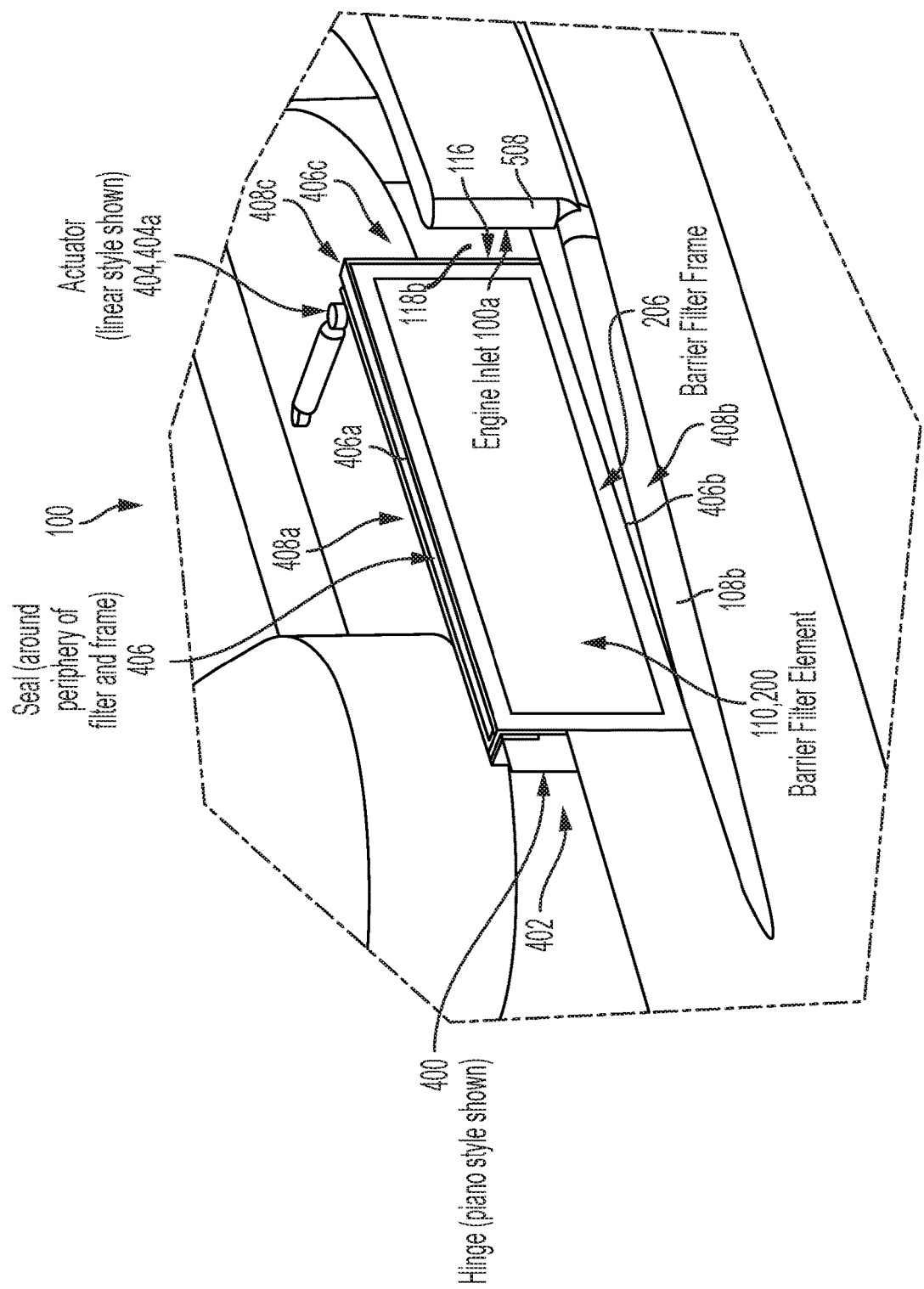
FIG. 4 illustrates the inlet system comprising a panel; a hinge, a seal, and an actuator, according to one or more embodiments.

FIG. 4 illustrates an inlet system 100 comprising a hinge 400 or hinge mechanism located at the forward end 402 of the deployable particle separator panel 110. The hinge both secures the forward end 402 of the particle separator panel 110 to the airframe (fuselage, fairing, or other fixed structure) and also provides a mechanism allowing the particle separator panel 110 to be repositioned from a stowed (flush) position to a deployed position and vice versa.

The hinge 400 can take many forms. In one example wherein the particle separator panel 110 of a specific installation is flat and the forward end 402 comprises a straight edge, the hinge can be a simple and inexpensive piano-hinge type of hinge. In another example wherein the particle separator panel 110 is curved along its forward end 402 (e.g., forward edge) because of specific loft or installation purposes, the hinge can include a two point mechanism. In yet further examples, hinges can employ bushings or rolling element bearings to provide the feature allowing the hinge mechanism to freely rotate. In yet further examples, the hinge 400 comprises arms or halves that are straight, or curved, or employ a goose neck shape depending on the specific installation.

In yet a further example, the hinge includes structural flexures providing for movement of the particle separator panel by means of physical deformation of the hinge in an elastic manner, with one end of the structural flexure fixed to a structure and the other end attached to the particle separator panel. The structural flexures can be metallic or composed of composite materials, for example.

Actuation Method

FIG. 4 further illustrates the aft end 116 of the deployable particle separator panel 110 is attached to an actuation mechanism 404. In one or more examples, the actuation mechanism is a an actuator 404a connecting to both the movable particle separator panel 110 and a fixed structure (e.g., skin 102). Examples of the actuator include, but are not limited to, a linear extension actuator or a rotary actuator.

In one or more examples, the actuator is attached to a mechanism aiding deployment or retraction the movable particle separator panel, such as a bellcrank or other related device. For example, the mechanism may amplify the range of motion of the actuator, or the mechanism may allow the actuator to be placed and oriented in a position better suited to minimizing the actuator either requiring a loft surface clearance protrusion or extending inside the aircraft structure and impacting systems and structures inside the structural skin 102.

Seals

FIG. 4 further illustrates the particle separator panel includes flexible seals 406 long its sides and aft edge. The seals contact the first sidewall 108a, the second sidewall 108b, and the inlet's sidewalls including the outer bell mouth when the particle separator panel 110 is deployed for air filtration. The seals 406 provide a physical barrier between edges or sides of the particle separator panel 110 and the walls of the inlet 100a so that sand, dust, and particles cannot bypass around the filtering mechanism in the particle separator panel 110 and be ingested by the machinery (turboshaft, etc.).

In the embodiment shown in FIG. 4, the seals 406 comprise a first seal 406a on a first side 408a of the particle separator panel 110, a second seal 406b on a second side 408b of the particle separator panel 110, and a third seal 406c on a third side 408c (aft end 116) of the particle separator panel 110.

Example: Combination with Propulsion System

Figure 5:
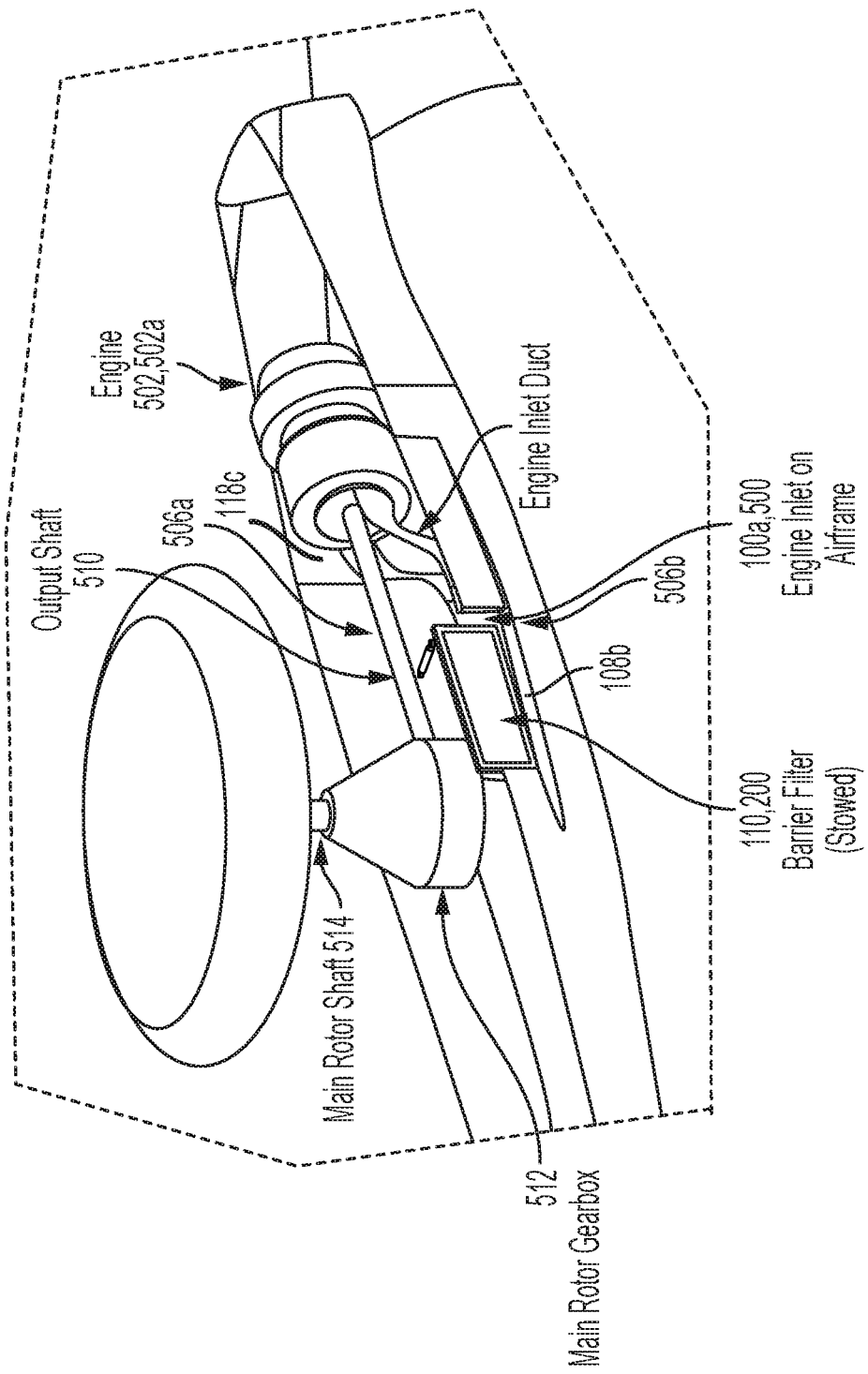
FIG. 5 illustrates the inlet system coupled to a propulsion system, according to one or more embodiments.

FIG. 1 and FIG. 5 illustrate an aircraft 104 including an airframe 150 having a skin 102; the skin including an inlet 100a comprising an engine inlet 500; a propulsion system 502 (engine 502a), e.g., positioned aft of the inlet 100a; and a duct 504 connecting the inlet 100a to the propulsion system so that the air 118 inputted to the inlet 100a is conveyed through the duct 504 to the propulsion system 502. The skin 102 (or a body panel 102b) further includes the first sidewall 108a extending forward of a first side 506a of the inlet 100a; a second sidewall 108b extending forward of a second side 506b of the inlet 100a; a particle separator panel 110 between the first sidewall 108a and the second sidewall 108b; a first seal 406a on a first side 408a of the particle separator panel 110, a second seal 406b on a second side 408b of the particle separator panel 110; and a third seal 406c on an aft end 116 of the particle separator panel 110.

An actuator 404a is attached to the particle separator panel 110. The actuator deploys the particle separator panel 110 to cover the inlet 100a so that the first seal 406a seals the first side 408a to the first sidewall 108a, the second seal 406b seals the second side 408b to the second sidewall 108b, and the third seal 406c seals the aft end 116 to a wall 508 of the inlet, thereby forcing air 118 inputted to the inlet 100a to flow through the particle separator panel 110. The actuator 404a retracts the particle separator panel 110 to uncover the inlet 100a (e.g., when filtering is no longer required, e.g., when the aircraft has left an environment containing a concentration of airborne particles 118a that is detrimental to operation of the propulsion system 502).

FIG. 5 further illustrates the propulsion system 502 includes an engine 502a driving an output shaft 510; and a gearbox 512 transmitting the power from the output shaft 510 to a main rotor shaft 514 driving a rotor 106a comprising one or more rotor blades 106b.

Example: Combination with an Environmental Control System

Figure 6:
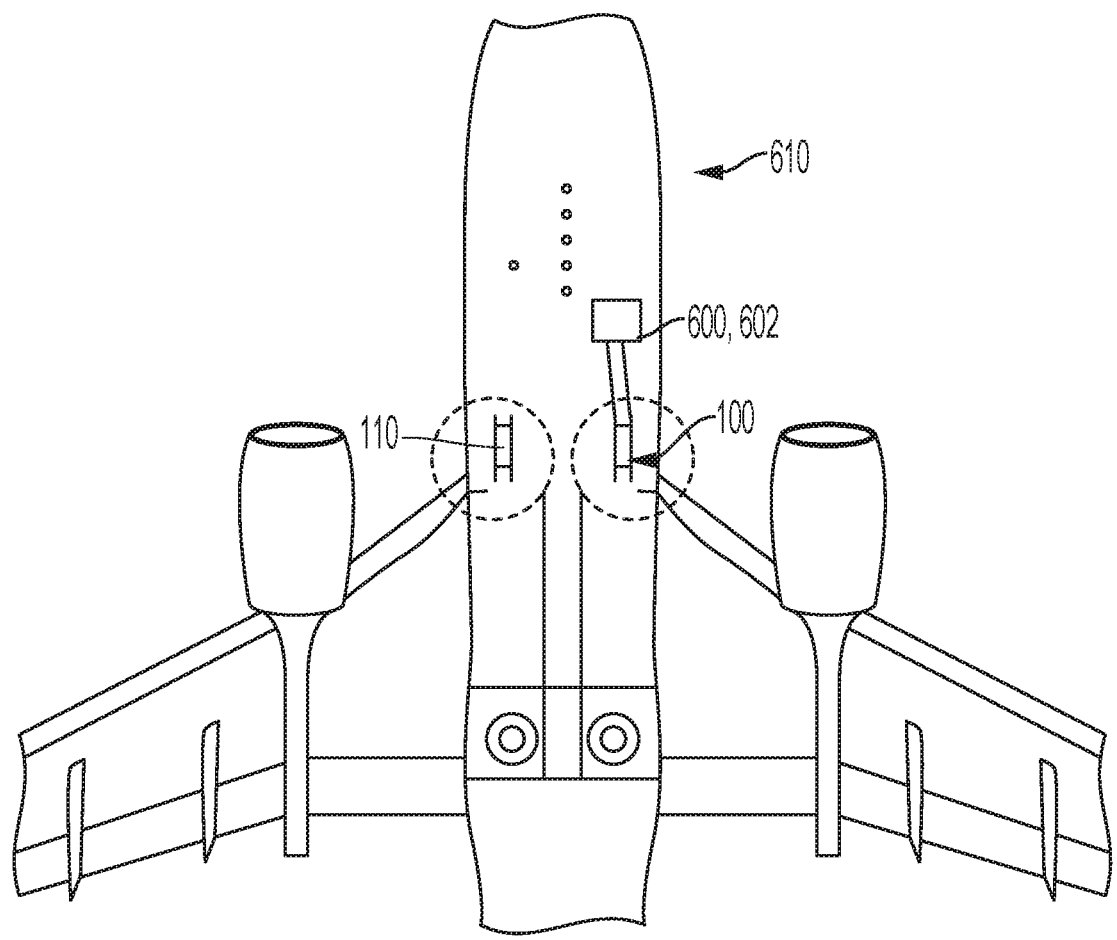
FIG. 6 illustrates the inlet system coupled to an environmental control system, according to one or more embodiments.

FIG. 6 illustrates an example wherein an environmental control system 600 on an airplane 610 is coupled to the inlet system 100 so that the air 118 drawn through the inlet 100a can be used in the environmental control system (e.g., air conditioning unit).

The inlet system is not limited to implementations in the examples discussed above. The inlet system can be implemented in a variety of applications.

Example: Method of Fabrication

Figure 7:
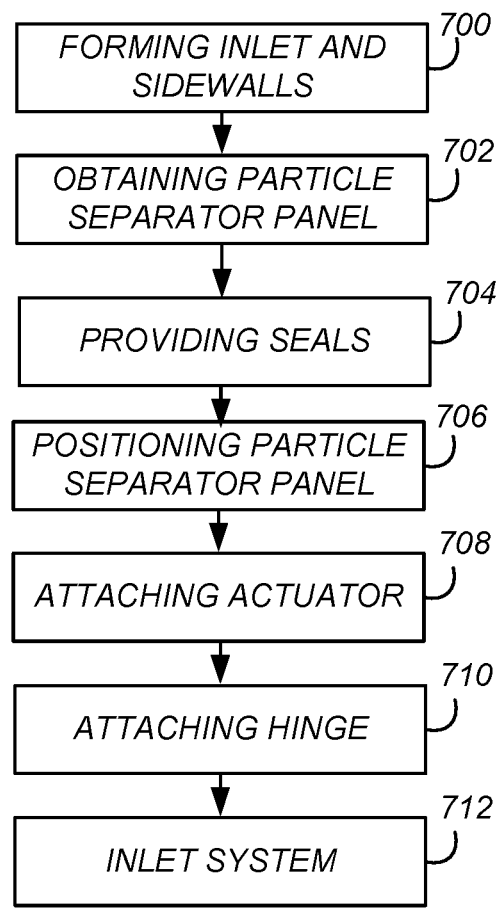
FIG. 7 is a flowchart illustrating a method of making an inlet system.

FIG. 7 is a flowchart illustrating a method of making an inlet system.

Block 700 represents providing an inlet system comprising the inlet 100a (e.g., opening); the first sidewall extending forward of a first side of the inlet; and the second sidewall extending forward of a second side of the inlet. In one or more examples, a body panel is formed to include the inlet 100a, the first sidewall, and the second sidewall. As well as extending forward of the inlet 100a, the first sidewall 108a and the second sidewall comprise sidewalls of the inlet 100a.

Block 702 represents obtaining a particle separator panel. In one example, the particle separator panel comprises a barrier filter including pores so that particles in the air larger than the pore are trapped in the barrier filter. In another example, the particle separator panel comprises swirl tubes drawing particles out of the air.

Block 704 represents providing a first seal on a first side of the particle separator panel and a second seal on a second side of the particle separator panel.

Block 706 represents positioning a particle separator panel 110 between the first sidewall and the second sidewall.

Block 708 represents attaching a means for deploying and retracting (or stowing) the particle separator panel (110). The step can include attaching an actuator to the particle separator panel, wherein the actuator deploys the particle separator panel to cover the inlet so that the first seal seals the first side to the first sidewall and the second seal seals the second side to the second sidewall, thereby forcing air inputted to the inlet to flow through the particle separator panel; and retracts the particle separator panel to uncover the inlet.

Any actuator or means of actuating (e.g., electric, hydraulic, or pneumatic means) suitable for moving the panel can be used.

Block 710 represents optionally attaching a hinge to a forward end of the particle separator panel so that the particle separator panel pivots about the hinge when the actuator deploys or retracts the particle separator panel and the actuator is attached to an aft end of the panel. Any hinge or means suitable for pivoting the panel can be used.

Block 712 represents the end result, an inlet system, comprising an inlet; a first sidewall extending forward of a first side of the inlet; a second sidewall extending forward of a second side of the inlet; a particle separator panel between the first sidewall and the second sidewall; a first seal on a first side of the particle separator panel and a second seal on a second side of the particle separator panel; and an actuator attached to the particle separator panel, wherein the actuator deploys the particle separator panel to cover the inlet so that the first seal seals the first side to the first sidewall and the second seal seals the second side to the second sidewall, thereby forcing air inputted to the inlet to flow through the particle separator panel; and retracts the particle separator panel to uncover the inlet. In one or more examples, the inlet system further includes a hinge attached to a forward end of the particle separator panel so that the particle separator panel pivots about the hinge when the actuator deploys or retracts the particle separator panel and the actuator is attached to an aft end of the panel.

Example: Method of Operation

Figure 8:
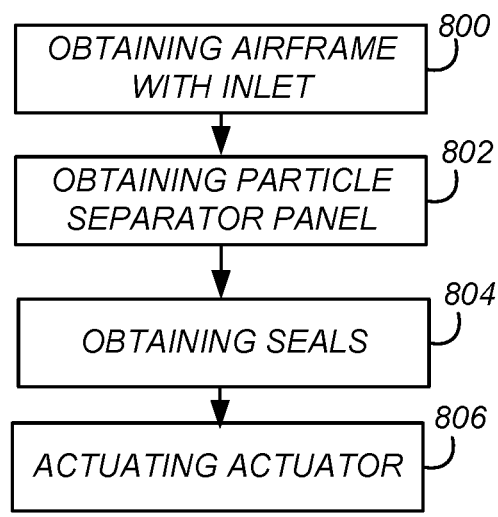
FIG. 8 is a flowchart illustrating a method of operating an inlet system.

FIG. 8 illustrates a method of operating an inlet, propulsion system, and/or environmental control system on an aircraft.

Block 800 represents providing or obtaining an airframe (150) having a skin (102), the skin (102) comprising an inlet (100a) coupled to an environmental control system (600) or propulsion system (502); a first side (408a, 506a) wall (508) extending forward of a first side (408a, 506a) of the inlet (100a); and a second side (408b, 506b) wall (508) extending forward of a second side (408b, 506b) of the inlet (100a);

Block 802 represents providing or obtaining a particle separator panel (110, 110a) between the first side (408a, 506a) wall (508) and the second side (408b, 506b) wall (508).

Block 804 represents providing or obtaining a first seal (406a) on a first side (408a, 506a) of the particle separator panel (110) and a second seal (406b) on a second side (408b, 506b) of the particle separator panel (110);

Block 806 represents actuating, using or activating the actuator (404a) attached to the particle separator panel (110), the actuator:

deploying the panel to cover the inlet (100a) so that the first seal (406a) seals (406) the first side (408a, 506a) to the first side (408a, 506a) wall (508) and the second seal (406b) seals (406) the second side (408b, 506b) to the second side (408b, 506b) wall (508), thereby forcing air (118) inputted to the inlet (100a) to flow through the particle separator panel (110, 110a) when operating the aircraft (104) in a dirty environment wherein the air (118) comprises particles (118a) that degrade operation of the environmental control system (600) or the propulsion system (502); and retracting the panel to uncover the inlet (100a) when the aircraft (104) is cruising in a cleaner environment wherein the air (118) comprises a concentration of the particles (118a) that does not substantially degrade performance of the propulsion system (502) or the environmental control system (600).

Advantages and Improvements

Exemplary systems described herein allows a rotorcraft to employ a particle separator panel including a barrier filter or swirl tube (e.g. vortex tube) during only specific portions of the mission—approaching and over ground operations—while allowing no installation losses imposed from the inlet system during long cruise portions of a mission. One of the design challenges with barrier filters or swirl tubes is that the surface area of the filter mechanism is much larger than the engine 'clean inlet face' area. Current fixed barrier or swirl tube systems employ large surface areas, typically in large box structures, forward of the engine. Embodiments described herein may use the same, larger area of filtering area, but are placed in the long ramp surface in front of the inlet. During flight operations not requiring the filtering, the panel is stowed (e.g., in the ramp surface flush with the surface of the aircraft) providing low drag and an unobstructed inlet. When the filter mechanism is deployed the engine draws its air through the larger filter area.

Example Embodiments

An inlet system or aircraft according to embodiments described herein can be embodied in many ways including, but not limited to, the following.

1. An inlet (100a) system, comprising:
an inlet (100a);
a first sidewall (108a) extending forward of a first side (408a, 506a) of the inlet (100a);
a second sidewall (108b) extending forward of a second side (408b, 506b) of the inlet (100a);
a particle separator panel (110) between the first sidewall (108a) and the second sidewall (108b);
a first seal (406a) on a first side (408a, 506a) of the particle separator panel (110) and a second seal (406b) on a second side (408b, 506b) of the particle separator panel (110);
an actuator (404a) attached to the particle separator panel (110), wherein the actuator (404a) deploys the particle separator panel (110) to cover the inlet (100a) so that the first seal (406a) seals (406) the first side (408a, 506a) to the first sidewall (108a) and the second seal (406b) seals (406) the second side (408b, 506b) to the second sidewall (108b), thereby forcing air (118) inputted to the inlet (100a) to flow through the particle separator panel (110). In one or more examples, the particle separator panel (110) is deployed when operating the aircraft (104) in a dirty environment where the air (118) comprises particles (118a) that degrade operation of the system coupled to the inlet and requiring the air for functioning (e.g., a system comprising an environmental control system (600) or a propulsion system (502)). The actuator retracts the particle separator panel (110, 110a) to uncover the inlet (100a), e.g., during flight operation not requiring the filtering. For example, the particle separator panel (110) can be retracted or stowed when the aircraft (104) is cruising in a cleaner environment where the air (118) comprises a concentration of the particles (118a) that does not substantially degrade performance of the system requiring the air for functioning (e.g., propulsion system (502) or the environmental control system (600)), thereby providing low drag and an unobstructed inlet. In one or more examples, low drag and an unobstructed inlet is provided when the ramp surface is flush with the surface of the aircraft.

2. The inlet (100a) system of embodiment 1, further comprising a hinge (400) attached to a forward end (402) of the particle separator panel (110) so that the particle separator panel (110) pivots about the hinge (400) when the actuator (404a) deploys or retracts the particle separator panel (110) and the actuator (404a) is attached to an aft end (116) of the panel.

3. The inlet (100a) system of embodiment 1 or 2, wherein the particle separator panel (110) comprises a barrier filter (200) including pores (208) so that particles (118a) in the air (118) larger than the pores (208) are trapped in the barrier filter (200), e.g., so that the barrier filter filters the air and the air transmitted to the system (502, 600) does not substantially include the particles (or includes a concentration of the particles reduced to a level that does not degrade performance of the system).

4. The inlet (100a) system of embodiment 1 or 2, wherein the particle separator panel (110) comprises swirl tubes drawing the particles (118a) out of the air (118), e.g., so that the particle separator panel (110) filters the air and the air transmitted to the system (502, 600) does not substantially include the particles (or includes a concentration of the particles reduced to a level that does not degrade performance of the system).

5. An environmental control system (600) coupled to the inlet (100a) of any of the embodiments 1-4 so that the air (118b) flowing through the inlet (100a) can be used in the environmental control system (600).

6. The system (600) of embodiment 5, wherein the environmental control system (600) is an air conditioning unit (602) conditioning the air (118) (e.g., cooling or heating the air breathable on the aircraft).

7. A propulsion system (502) coupled to the inlet (100a) of any of the embodiments 1-4 such that the air (118c) flowing through the inlet (100a) can be used to combust fuel in the propulsion system (502).

8. The inlet (100a) of any of the embodiments 1-7, wherein the first sidewall (108a), the second sidewall (108b), and the inlet (100a) are in a skin (102) of an airframe (150).

9. The inlet (100a) of embodiment 8, wherein the particle separator panel (110) is flush with the skin (102) when the particle separator panel (110) is retracted, thereby providing low drag and an unobstructed inlet.

10. The inlet (100a) of any of the embodiments 1-9, wherein the first side (408a, 506a) wall (508), the second side (408b, 506b) wall (508), and the inlet (100a) are in a body panel (102b).

11. An aircraft (104), comprising;
an airframe (150) having a skin (102), the skin (102) comprising:
an inlet (100a);
a first sidewall (108a) extending forward of a first side (408a, 506a) of the inlet (100a); and
a second sidewall (108b) extending forward of a second side (408b, 506b) of the inlet (100a);
a particle separator panel (110) between the first sidewall (108a) and the second sidewall (108b);

a first seal (406a) on a first side (408a, 506a) of the particle separator panel (110) and a second seal (406b) on a second side (408b, 506b) of the particle separator panel (110);

an actuator (404a) attached to the particle separator panel (110), wherein the actuator (404a):

deploys the panel to cover the inlet (100a) so that the first seal (406a) seals (406) the first side (408a, 506a) to the first sidewall (108a) and the second seal (406b) seals (406) the second side (408b, 506b) to the second sidewall (108b), thereby forcing air (118) inputted to the inlet (100a) to flow through the particle separator panel (110); and retracts the panel to uncover the inlet (100a); and a propulsion system (502) positioned aft of the inlet (100a) so that the air (118) flowing through the inlet (100a) can be used to power the propulsion system (502).

12. The aircraft (104) of embodiment 11, wherein the aircraft (104) comprises a helicopter (106) and the propulsion system (502) comprises an engine (502a) for a rotor (516) providing the helicopter (106) with lift.

13. The aircraft (104) of embodiment 11, further comprising a hinge (400) attached to a forward end (402) of the particle separator panel (110, 110a) so that the particle separator panel (110) pivots about the hinge (400) when the actuator (404a) deploys or retracts the particle separator panel (110) and the actuator (404a) is attached to an aft end (116) of the panel.

14. The aircraft (104) of embodiment 11, wherein the particle separator panel (110) comprises a barrier filter (200) including pores (208) so that particles (118a) in the air (118) larger than the pores (208) are trapped in the barrier filter (200).

15. The aircraft (104) of embodiment 11, wherein the particle separator panel (110) comprises swirl tubes (300) drawing particles (118a) out of the air (118).

16. The aircraft (104) of embodiment 11, wherein the propulsion system (502) is coupled to the inlet (100a) so that the air (118) flowing through the inlet (100a) can be used to combust fuel in the propulsion system (502).

17. The aircraft (104) of embodiment 11, wherein aircraft (104) includes an airframe (150) comprising a skin (102), and the first sidewall (108a), the second sidewall (108b), and the inlet (100a) are in the skin (102).

18. The aircraft (104) of embodiment 17, wherein the particle separator panel (110) is flush with the skin (102) when the particle separator panel (110) is retracted.

19. The aircraft (104) of embodiment 11, wherein the aircraft (104) comprises a body panel (102b) and the first sidewall (108a), the second sidewall (108b), and the inlet (100a) are in the body panel (102b).

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An inlet system, comprising:
an inlet;
a first sidewall extending forward of a first side of the inlet;
a second sidewall extending forward of a second side of the inlet;
a particle separator panel between the first sidewall and the second sidewall;
a first seal on a first side of the particle separator panel and a second seal on a second side of the particle separator panel;
an actuator attached to the particle separator panel, wherein the actuator:
deploys the particle separator panel to cover a front surface of the inlet so that the first seal seals the first side to the first sidewall and the second seal seals the second side to the second sidewall, thereby forcing air inputted to the inlet to flow through the particle separator panel; and
retracts the particle separator panel to uncover the inlet by moving an aft end of the particle separator panel across the front surface of the inlet.

2. The inlet system of claim 1, further comprising a hinge attached to a forward end of the particle separator panel so that the particle separator panel pivots about the hinge when the actuator deploys or retracts the particle separator panel and the actuator is attached to the aft end of the particle separator panel.

3. The inlet system of claim 1, wherein the particle separator panel comprises a barrier filter including pores so that particles in the air larger than the pores are trapped in the barrier filter.

4. The inlet system of claim 1, wherein the particle separator panel comprises a swirl tube drawing particles out of the air.

5. An environmental control system coupled to the inlet of claim 1 so that the air flowing through the inlet can be used in the environmental control system.

6. The system of claim 5, wherein the environmental control system is an air conditioning unit.

7. A propulsion system coupled to the inlet of claim 1 such that air flowing through the inlet can be used to combust fuel in the propulsion system.

8. The inlet of claim 1, wherein the first sidewall, the second sidewall, and the inlet are in a skin of an airframe.

9. The inlet of claim 8, wherein the particle separator panel is flush with the skin when the particle separator panel is retracted.

10. The inlet of claim 1, wherein the first sidewall, the second sidewall, and the inlet are in a body panel.

11. An aircraft, comprising;
an airframe having a skin, the skin comprising:
an inlet;
a first sidewall extending forward of a first side of the inlet; and
a second sidewall extending forward of a second side of the inlet;
a particle separator panel between the first sidewall and the second sidewall;
a first seal on a first side of the particle separator panel and a second seal on a second side of the particle separator panel;
an actuator attached to the particle separator panel, wherein the actuator:
deploys the particle separator panel to cover a front surface of the inlet so that the first seal seals the first side to the first sidewall and the second seal seals the second side to the second sidewall, thereby forcing air inputted to the inlet to flow through the particle separator panel; and retracts the particle separator panel to uncover the inlet by moving an aft end of the particle separator panel across the front surface of the inlet; and a propulsion system positioned aft of the inlet so that the air flowing through the inlet can be used to power the propulsion system.

12. The aircraft of claim 11, wherein the aircraft comprises a helicopter and the propulsion system comprises an engine for a rotor providing the helicopter with lift.

13. The aircraft of claim 11, further comprising a hinge attached to a forward end of the particle separator panel so that the particle separator panel pivots about the hinge when the actuator deploys or retracts the particle separator panel and the actuator is attached to the aft end of the particle separator panel.

14. The aircraft of claim 11, wherein the particle separator panel comprises a barrier filter including pores so that particles in air larger than the pores are trapped in the barrier filter.

15. The aircraft of claim 11, wherein the particle separator panel comprises swirl tubes drawing particles out of air.

16. The aircraft of claim 11, wherein the propulsion system is coupled to the inlet so that-air flowing through the inlet can be used to combust fuel in the propulsion system.

17. The aircraft of claim 11, wherein the aircraft includes the airframe comprising a skin, and the first sidewall, the second sidewall, and the inlet are in the skin.

18. The aircraft of claim 17, wherein the particle separator panel is flush with the skin when the particle separator panel is retracted.

19. The aircraft of claim 11, wherein the aircraft comprises a body panel and the first sidewall, the second sidewall, and the inlet are in the body panel.

20. A method of operating an aircraft, comprising:
providing or obtaining the aircraft comprising an airframe having a skin, the skin comprising:
  an inlet coupled to an environmental control system or propulsion system;
  a first sidewall extending forward of a first side of the inlet; and
  a second sidewall extending forward of a second side of the inlet;
providing or obtaining a particle separator panel between the first sidewall and the second sidewall;
providing or obtaining a first seal on a first side of the particle separator panel and a second seal on a second side of the particle separator panel; and
actuating an actuator attached to the particle separator panel; the actuator:
  deploying the particle separator panel to cover a front surface of the inlet so that the first seal seals the first side to the first sidewall and the second seal seals the second side to the second sidewall, thereby forcing air inputted to the inlet to flow through the particle separator panel when operating the aircraft in a dirty environment wherein the air comprises particles that degrade operation of the environmental control system or the propulsion system; and
  retracting the particle separator panel to uncover the inlet when the aircraft is cruising in a cleaner environment wherein the air comprises a concentration of the particles that does not substantially degrade performance of the propulsion system or the environmental control system, wherein the retracting comprises moving an aft end of the particle separator panel across the front surface of the inlet.

* * * * *